United States Patent
Panusopone et al.

(10) Patent No.: US 7,084,877 B1
(45) Date of Patent: Aug. 1, 2006

(54) GLOBAL MOTION ESTIMATION FOR SPRITE GENERATION

(75) Inventors: Krit Panusopone, San Diego, CA (US); Xuemin Chen, San Diego, CA (US)

(73) Assignee: General Instrument Corporation, Horsham, PA (US)

(*) Notice: Subject to any disclaimer, the term of this patent is extended or adjusted under 35 U.S.C. 154(b) by 1128 days.

(21) Appl. No.: 09/587,961

(22) Filed: Jun. 6, 2000

(51) Int. Cl.
*G06T 17/00* (2006.01)

(52) U.S. Cl. .................................................. 345/474
(58) Field of Classification Search ................ 345/474, 345/473, 441; 382/284
See application file for complete search history.

(56) References Cited

U.S. PATENT DOCUMENTS

| | | | |
|---|---|---|---|
| 5,959,673 A | 9/1999 | Lee et al. | |
| 5,982,438 A | 11/1999 | Lin et al. | |
| 6,026,195 A | 2/2000 | Eifrig et al. | |
| 6,205,260 B1 * | 3/2001 | Crinon et al. | ................ 382/284 |

FOREIGN PATENT DOCUMENTS

| | | |
|---|---|---|
| DE | 30 25 846 | 1/1981 |
| WO | WO 98/59497 | 12/1998 |

OTHER PUBLICATIONS

Bergen et al., "A Three-Frame Algorithm for Estimating Two-Component Image Motion," IEEE Transactions On Pattern Analysis and Machine Intelligence, vol. 14, No. 9, Sep. 1992.*

"MPEG-4 Video Verification Model Version 9.1",, Appendix D: Off-Line Sprite Generation, ISO/IEC JTC1/SC29/WG11. MPEG98/M3100, Feb. 1998.

J. Konrad, et al., "Improved Global Motion Estimation for N3", ISO/IEC JTC1/SC29/WG11, MPEG97/M3096, Feb. 1998.

C. Gu, et al., "Results Report on Core Experiment N3—Sprite Generation", ISO/IEC JTC1/SC29/WG11, MPEG96/M1350, Sep. 1996.

* cited by examiner

*Primary Examiner*—Cliff N. Vo
(74) *Attorney, Agent, or Firm*—Barry R. Lipsitz; Douglas M. McAllister

(57) ABSTRACT

A complete automatic sprite generation system uses first-order prediction for an initial estimation, delayed elimination for outlier rejection, and field-based sprite generation for an interlaced source. Optionally, higher-order prediction for the initial estimation may be used to handle more complicated motion. The invention is useful for generating sprites, e.g., for 3D sequences, stock tickers, interactive advertising and other uses. The invention addresses outlier and fast motion problems that are not handled by the existing MPEG-4 scheme. Automatic sprite generation is provided by performing shot detection (e.g., panning or zooming) on the input images to provide a group of successive images that share a common scene for use in forming a sprite. The initial estimation of motion parameter data for forming the sprite is improved by using the motion parameter data of at least two previous input images. Delayed outlier rejection is performed in two steps by eliminating pixels whose error increases in successive sprite iterations. For interlaced input images, a sprite and set of motion parameters are encoded and transmitted for each field separately, then decoded and combined at a presentation engine at a decoder.

22 Claims, 10 Drawing Sheets

GLOBAL MOTION ESTIMATION FOR SPRITE GENERATION

BACKGROUND OF THE INVENTION

The present invention relates to sprite generation and 3-D motion estimation, and newly-developed techniques for global motion estimation.

1. Introduction

A sprite is a still image that represents an entire visible scene. A sprite may be represented by two-dimensional arrays of luminance, chrominance and grayscale alpha data.

In practice, a sprite is generated from computer-animated graphics or a collection of natural images taken at several portions of the static background. In this sense, a sprite has the same meaning as an image mosaic in photogrammetry, image processing and computer graphics.

For example, as shown in FIG. 9, a sprite 950 may be formed from successive images 910 and 930. Each feature in the sprite 950 is registered with a corresponding feature from the input images (e.g., frames) 910 and 930. Motion parameters describe the warping of the sprite that achieves the closest match with the input image feature. The sprite may have to be warped differently to each input frame in the sequence, e.g., due to camera motion or motion of an object.

For example, the tree object 912" is based on the tree object 912 from the first input image 910. The house object 914" is based on the house objects 914 and 914' from the first and second input images 910 and 930, respectively. The tree object 916" is based on the tree object 916' of the second input image 930.

Moreover, if the sprite is a background object in a sequence that is not entirely visible in certain frames due to foreground objects or camera motion, such as panning, a complete sprite can be obtained by gradually updating it over the sequence by collecting the relevant pixels of the input frames.

The sprite has become popular in various applications such as video games, interactive advertising, virtual travel, etc. A sprite provides an efficient way to navigate through a scene. Any portion of a scene at any angle can be constructed by appropriately warping and cropping the sprite. Therefore, it is increasingly used in advertisements on the Internet. For example, a sprite can be generated for the inside of an automobile and a user can rotate the viewing angle to look around and /or zoom in or out.

Another example is sending a stock ticker using a sprite rather than moving video, which can reduce the amount of data by a factor of more than twenty, according to our studies. A logo (e.g., station identifier, advertisement or the like) can also be sent as a sprite.

A sprite is very beneficial in terms of coding efficiency since there is a redundant or very easy to re-encode part of the scene in the sprite that is revisited in the new image. Therefore, MPEG-4 (ISO/IEC 14496-2 Final Draft of International Standard, "Information Technology—Coding of audio-visual objects, Part 2: visual," MPEG98/N2502, December 1998) has standardized the sprite coding tools by including them in its visual part. A static sprite only provides the warping result of the sprite piece, while a dynamic sprite (DS) and global motion compensation (GMC) allow the warping result to blend and locally adjust with the previously decoded video object plane (VOP). A sprite piece is basically an image, but has its origin from the image mosaic (e.g., mosaic piece).

The static sprite has already been adopted for MPEG-4 visual version 1, and the DS and GMC are expected to be included in version 2. According to the version 1 syntax, a static sprite piece is coded as a regular intra VOP at once at the beginning of a sequence, or piece-by-piece in the low latency mode. Global motion parameters (up to eight for the perspective motion model) are also coded at every VOP. The sprite piece and global motion parameter, however, are not part of the MPEG-4 encoder and are required as an input to the MPEG-4 encoder.

Although MPEG-4 video offers coding tools for sprites, its does not specify normatively how to generate sprites. Only a brief description of the reference algorithm is provided in the informative section of the MPEG-4 video verification model version 9.1 (informative section) (ISO/IEC 14496-2 MPEG-4 Video Verification Model Version 9.1, MPEG98/M3100, February 1998).

Accordingly, it would be desirable to provide an improved global motion estimation technique for an off-line sprite generation. The technique should extend the reference algorithm developed by core experiments in MPEG-4 (refer to MPEG98/M31002, and J. Konrad and F. Dufaux, "Improved global motion estimation for N3," ISO/IEC JTC1/SC29/WG11 MPEG98/M3096, February 1998).

The original MPEG-4 method uses an iterative nonlinear minimization algorithm for the perspective global motion estimation. Such an iterative algorithm relies heavily on the quality of the initial estimation.

Accordingly, it would be desirable to improve the performance of sprite coding and allow more flexibility to the source sequences, e.g., by providing new tools such as automatic sprite generation system, first-order prediction for initial estimation, delayed elimination for outlier rejection, and field based sprite generation for an interlaced source.

It would be desirable to provide a technique for determining a more accurate initial estimation based on the pre-warping and recursive techniques.

It would be desirable to improve the accuracy of sprite generation and motion parameters with an effective outlier rejection scheme.

It would also be desirable to improve the quality of sprite generation and motion parameters under both controlled and uncontrolled conditions. The controlled condition is the ideal condition that is expected in the normal environment, e.g., no noise in the scene, video moves slowly from frame to frame.

The present invention provides a system having the above and other advantages.

SUMMARY OF THE INVENTION

The present invention relates to sprite generation and 3-D motion estimation, and newly-developed techniques for global motion estimation.

The sprite generation algorithm suggested by MPEG-4 is not ready for practical use since, in part, its global motion estimation technique is susceptible to outlier and fast motion problems.

The present invention addresses these and other concerns by providing a complete automatic sprite generation system, first-order prediction for an initial estimation, delayed elimination for outlier rejection, and field-based sprite generation for an interlaced source.

Optionally, higher-order prediction for the initial estimation is used to handle more complicated motion.

The invention is useful for generating sprites, e.g., for 3D sequences, stock tickers, interactive advertising and a variety of other uses.

In particular, automatic sprite generation is provided by performing shot detection on the input images to provide a group of successive images that share a common static background for use in forming a sprite. The shot detection may detect panning, in which case block matching in the initial estimation of a motion parameter is turned on, or zooming, in which case block matching in the initial estimation is turned off.

The initial estimation of motion parameter data for forming the sprite from a series of input images may be provided based on motion parameters of at least two input images that precede the initial input image, e.g., using linear prediction or non-linear prediction of motion parameters of the at least two previous input images. In a particular embodiment, the initial estimation of the motion parameter $S_n$ is provided according to: $S_n = S_{n-1} + (S_{n-1} - S_{n-2})$, where $S_{n-1}$ is a motion parameter of an input image that precedes the initial input image, and $S_{n-2}$ is a motion parameter of the next preceding input image.

In a further embodiment, delayed outlier rejection is achieved by providing at least first and second successive estimates of motion parameter data for providing a registration between the sprite and the initial input image. At least first and second errors between pixels of the initial input image and pixels of the sprite are determined based on the at least first and second estimates, respectively. The second estimate is obtained by updating the first estimate based on the first error. The pixels whose second error exceeds their first error are eliminated from consideration in generating the sprite.

In a further embodiment, a method for generating sprite data from a series of input images that comprises interlaced first and second fields, includes the steps of: generating separate first and second field sprites with separate sets of motion parameter data for the first and second fields of the input images, respectively, and encoding the first field sprite and its associated motion parameter data separately from the second field sprite and its associated motion parameter data for transmission to at least one decoder.

A corresponding method for processing sprite data at a decoder includes the step of: receiving data transmitted from an encoder, where the data includes an encoded first field sprite and its associated motion parameter data, and a separately encoded second field sprite and its associated motion parameter data. The first and second field sprites are generated from interlaced first and second fields, respectively, of at least one initial input image at the encoder. The method includes the further steps of: decoding the encoded first field sprite and its associated motion parameter data to provide a first field sprite output; decoding the encoded second field sprite and its associated motion parameter data to provide a second field sprite output; and combining the first field sprite output and second field sprite output to form a combined sprite output, e.g., for a display such as a television or computer monitor.

Corresponding methods and apparatuses are presented.

DETAILED DESCRIPTION OF THE INVENTION

Figure 1:
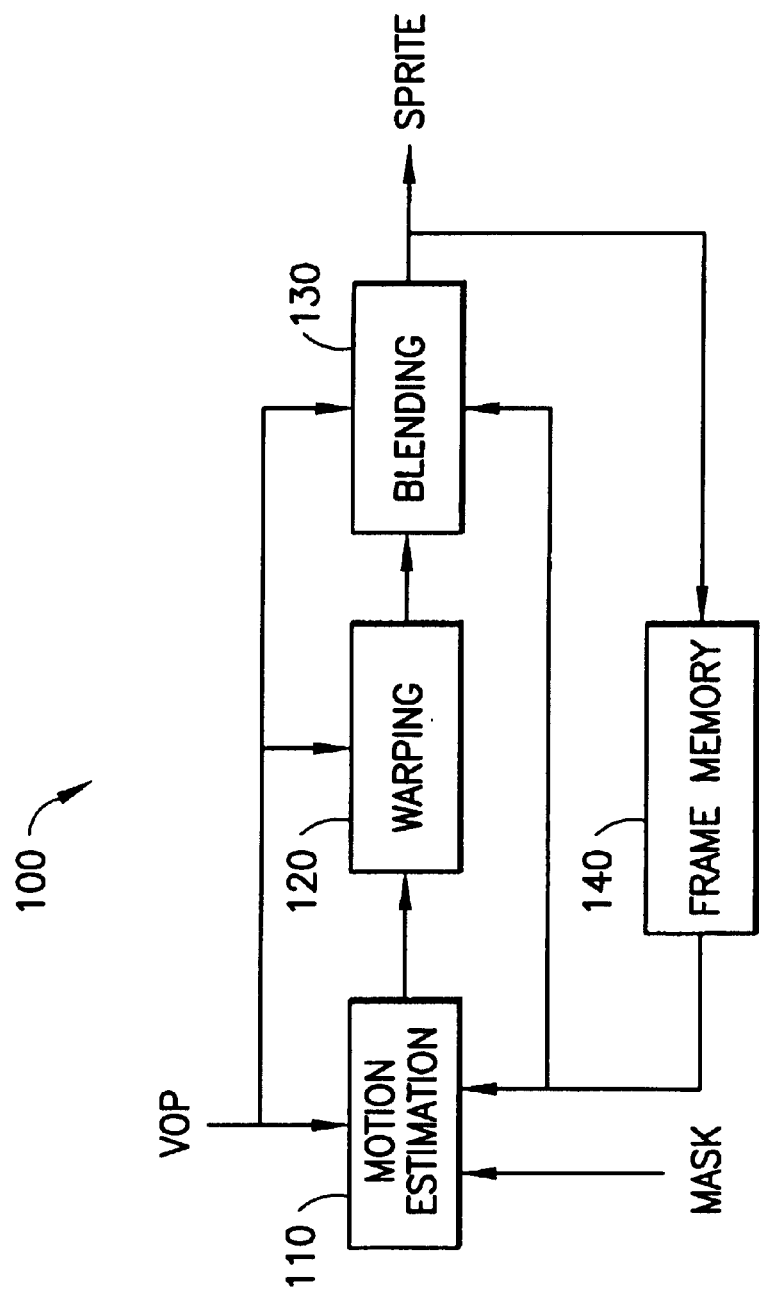
FIG. 1 illustrates a sprite generation apparatus in accordance with the present invention.

The present invention relates to generating sprite images.

2. Sprite Generation and Global Motion Estimation

This section provides an overview of the sprite generation for the MPEG-4 encoder. The required inputs to the MPEG-4 encoder are the sprite piece and the motion parameter. This motion parameter includes a traditional motion vector (as in MPEG-2) as a special case (for the translation motion model). The MPEG-4 encoder compresses the sprite piece using an intra coding mode. The image at any time instance is represented by sprite trajectories (sprite reference points) which are the 1, 2, 3, or 4 corners (depending on the motion model) of the warped sprite piece according to the motion parameter.

The sprite piece and the motion parameter are closely related and, hence, are determined simultaneously in the sprite generation. The sprite piece is built by warping the new image according to the global motion parameter and updating it on the current sprite based on the blending scheme. A key problem is how to find the motion parameter for every image. This problem falls in the general case of an image registration problem. The optimal solution is the motion (warping) parameter that maximizes the correlation between the registering (new image) and the registered (sprite) images. A statistical approach for image registration with only translational motion is provided in W. K. Pratt, "Correlation techniques of image registration," IEEE Trans. Aerospace Electronics and Systems, vol. AES-10, pp. 353–358, May 1974.

Three-dimensional (3D) motion, which requires a complete geometry transformation in 3D space, allows a full range of motion, e.g., rotation, zoom, and shear between two images. An overview of the 3D motion estimation methods is given in T. S. Huang, and A. N. Netravali, "Motion and structure from feature correspondences: A review," Proc. IEEE, vol. 82, pp. 252–268, July 1997.

For natural video, MPEG-4 sprite coding is appropriate for an image sequence containing a static background and experiencing a camera motion. This situation is valid for MPEG-4 since coding of arbitrary shapes allows the input to be separated into several objects depending on the associated alpha plane and, hence, sometimes the moving part can be separated into another object and be excluded from the sprite. Under this assumption, part of a new image experiences a deformation from part of the previous image or sprite, and pixels in a sprite are hence related to the pixels in a masked image by the planar perspective transformation (forward warping), discussed in MPEG98/M3100 and H. Y. Shum and R. Szeliski, "Panoramic image mosaics," Technical Report, MSR-TR-97-23, Microsoft Research, 1997, as follows:

$$x' = \frac{m[0]x + m[1]y + m[2]}{m[6]x + m[7]y + m[8]}$$

$$y' = \frac{m[3]x + m[4]y + m[5]}{m[6]x + m[7]y + m[8]}$$

where m[0] to m[8] are perspective coefficients (m[8] is set to 1 for the planar case), and (x,y) and (x',y') are the coordinates of the pixels in the warped image and sprite, respectively. The inverse warping describes the relation between the pixels in the masked image and the pixels in the sprite, i.e., $$x = \frac{(m[4]m[8] - m[5]m[7])x' + (m[2]m[7] - m[1]m[8])y' + m[1]m[5] - m[2]m[4]}{(m[3]m[7] - m[4]m[6])x' + (m[1]m[6] - m[0]m[7])y' + m[0]m[4] - m[1]m[3]}$$

$$y = \frac{(m[5]m[6] - m[3]m[8])x' + (m[0]m[8] - m[2]m[6])y' + m[2]m[3] - m[0]m[5]}{(m[3]m[7] - m[4]m[6])x' + (m[1]m[6] - m[0]m[7])y' + m[0]m[4] - m[1]m[3]}$$

Perspective coefficients in the planar perspective transformation are parameters that describe the deformation between the masked image and the sprite. Global motion estimation attempts to find the best registration (motion parameter) of the masked image on the sprite which, in turn, determines the deformation and the perspective coefficients. Once the masked image is transformed via the inverse warping, it is blended to the current sprite to build an updated sprite. Inverse warping is normally used instead of forward warping to avoid the hole in the updated sprite caused by the stretching of the current sprite in the forward warping. The invention is applicable to either forward or reverse warping.

Blending is the final process of off-line sprite generation. Blending takes two inputs and blends them together according to a weighting factor. A weighting factor specifies the mixing ratio between the two inputs at any position. In MPEG-4, it is a integer variable for any pixel in a sprite, and it is increased by a defined constant such as one whenever its corresponding pixel is updated. By incrementally adding (updating) the new image to the sprite with the equal weight, noise in a single image is smoothened out. Note that blending in the on-line sprite coding process constructs an updated sprite using the new VOP and the sprite. In this case, the blending factor is a floating point constant between zero and one (the blending factor is always one for a static sprite).

3. MPEG-4 Perspective Motion Estimation Algorithm

MPEG-4 activities on sprite generation are conducted within the core experiment, N3. Two global motion estimation algorithms (MPEG98/M3096 and C. Gu, T. Markoc, R. Szeliski and M. C. Lee, "Results report on core experiment N3—Sprite generation," ISO/IEC JTC1/SC29/WG11 MPEG96/M1350, September 1996) have been investigated in N3 and widely used in the core experiment on sprite coding. The M1350 proposal has formed a reference algorithm in the annex of the MPEG-4 VM (M3100). The M3096 proposal is a refined method based on M3100. The following subsections describe details of these two algorithms.

3.1 MPEG96/M1350 Proposal

FIG. 1 shows an overview of an off-line sprite generation apparatus 100 in accordance with the present invention.

The apparatus 100 is based on the MPEG-4 VM, which is based on M1350, but proposes a new algorithm for the motion estimation function 110. All elements in FIG. 1 are needed to generate the sprite piece. The motion estimation function 110 receives mask data, VOP data, and data from a frame memory 140. A warping function 120 provides warping based on the VOP data and the output of the motion estimation function 110. A blending function 130 provides blending based on the VOP data and the output of the warping function and the frame memory to provide a sprite. In particular, the blending function 130 updates the sprite piece by blending the current VOP (after an appropriate warping) to the existing sprite piece.

Similar warping and blending as discussed in the previous section are used in this process. Since the perspective motion model adopted in MPEG-4 is nonlinear, motion estimation, which attempts to minimize the error between the input image and sprite by finding the optimum deformation parameter of the input image, has to rely on a nonlinear minimization technique. The core process of perspective motion estimation in MPEG-4 VM is a nonlinear minimization technique called "Levenberg-Marquardt" (LM) (see W. H. Press, S. A. Teukolsky, W. T. Vetterling and B. P. Flannery, "Numerical recipes in C," Cambridge Univ. Press, 1992) which is essentially an iterative algorithm. The LM technique solves the nonlinear least-square problem efficiently by adaptively adjusting its algorithm between the steepest descent and the inverse Hessian method according to the $\chi^2$ merit function (although $\chi^2$ is not used in VM). LM tries to solve the normal equation.

$$\Delta m = A^{-1}b$$

where A is an approximate Hessian matrix which has the component $$a_{kl} = \sum_i \frac{\partial e_i}{\partial m_k} \frac{\partial e_i}{\partial m_l}.$$

b is the weighted gradient vector which has the component $$b_k = -\sum_i e_i \frac{\partial e_i}{\partial m_k}$$

A Gaussian pyramid can be used together with LM to speed up the process. Motion parameters between the pyramid level are related by $$m_6 = m_6/2, m_7 = m_7/2, m_2 = m_2*2, m_5 = m_5*2.$$

3.2 MPEG96/M1350 Proposal

Figure 2:
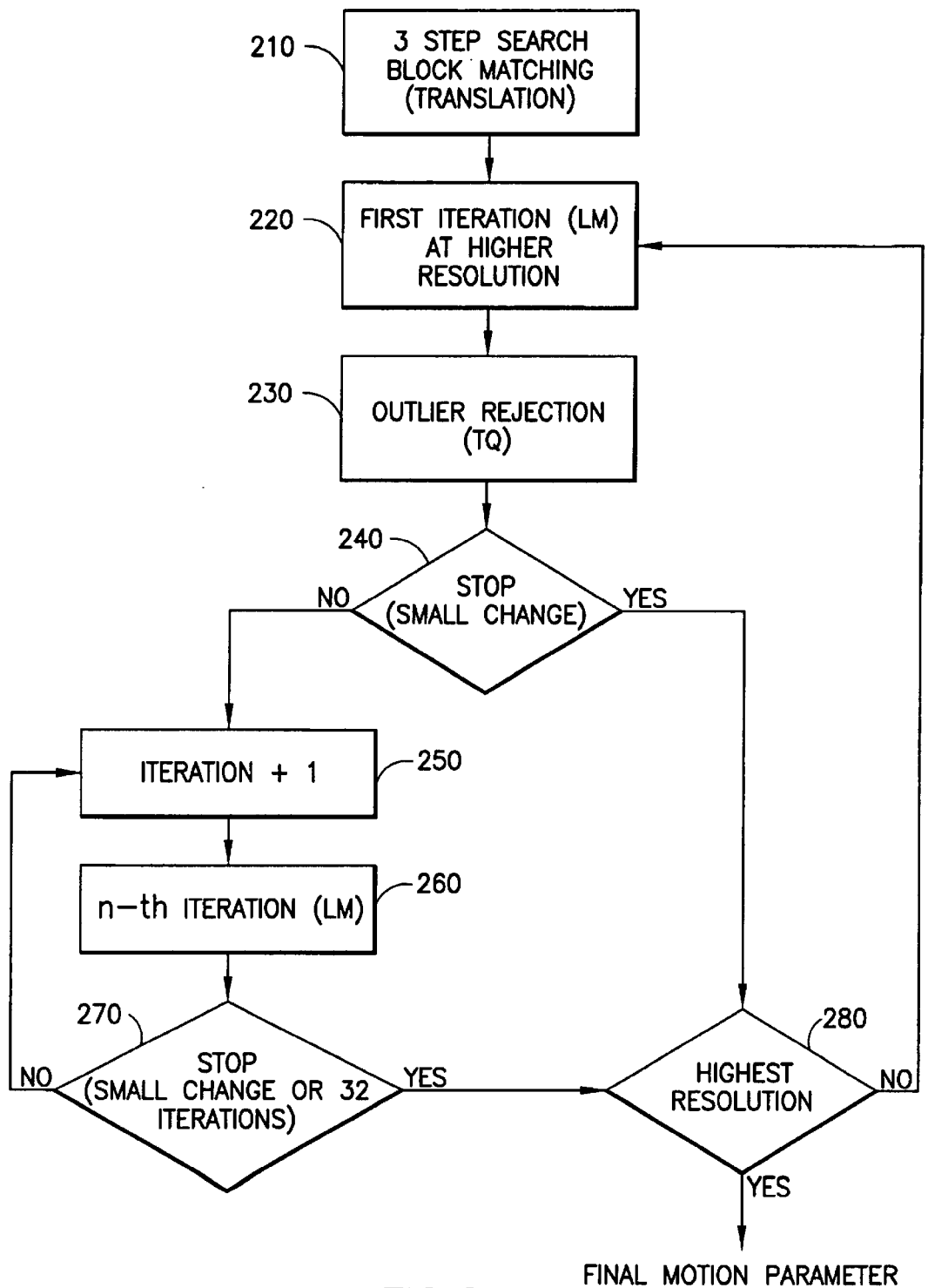
FIG. 2 illustrates a flow chart of a global motion estimation method.

FIG. 2 illustrates an improvement to the MPEG-4 VM perspective motion estimation.

This technique starts with an initial estimation using a three-step search block matching algorithm (block 210) to estimate the translational motion parameter. This estimation is performed at the coarsest (lowest) resolution. The motion parameter obtained from the initial estimation starts the LM algorithm, which is performed recursively starting from the coarse resolution and refining the result at the finer (higher) resolution (blocks 220, 280). The result of every stage is the result after 32 iterations (blocks 250–270). However, the iteration stops once the updated parameter is smaller than a preset threshold (block 240).

The effect of an outlier is alleviated by an outlier rejection method such as "Truncated Quadratic" (TQ) (block 230). It aligns the input image and sprite together according to the motion parameter determined by LM of that stage and then calculates an error (a quadratic function in this case) of every pixel inside both objects. Any pixel which contributes to the 10% highest error of that image is excluded from the subsequent minimization. The truncated quadratic process is carried out at the first iteration of every resolution.

4. The Proposed Modification Techniques

In accordance with the invention, this section describes the modification of the perspective motion estimation to improve the performance in an uncontrolled condition. Such a condition is likely to occur when there is a high motion in the scene such as a fast pan of a camera. The proposed modification techniques use the LM to minimize the differential frame difference between the sprite and input image. A high accuracy of the initial estimation is necessary for the LM to converge to the global minimum. The first subsection (4.1) will discuss this problem in more detail.

A modification to the MPEG-4 VM to improve the accuracy of the initial estimation will also be described. The second subsection (4.2) also attacks another problem in an uncontrolled condition where noise exists in the scene. The second subsection will show that the TQ method is not suitable for outlier rejection, and a better alternative is proposed. The third subsection (4.3) will discuss a method to handle interlaced sources. This problem has not yet been investigated in the core experiment N3.

On-line sprite generation from a natural video sequence requires a preprocessing stage that can create the input sequence suitable for a sprite automatically.

Figure 3:
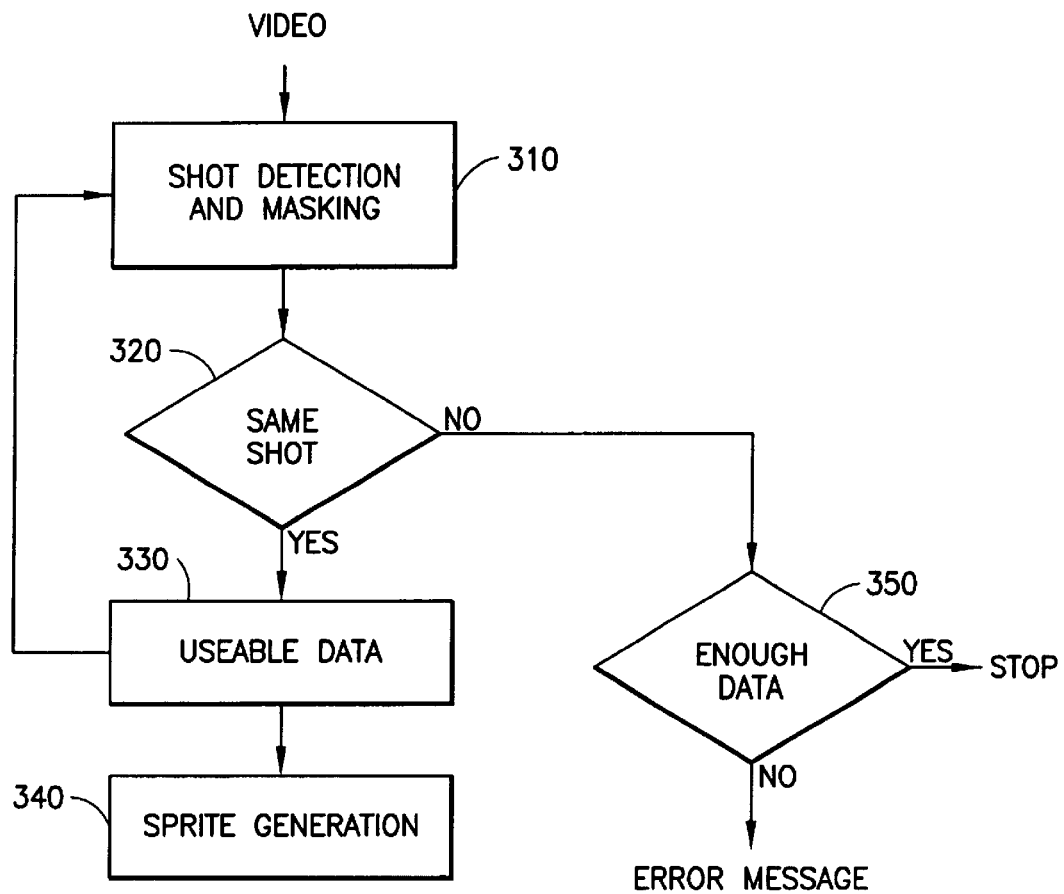
FIG. 3 illustrates an automatic sprite generation system in accordance with the present invention.

FIG. 3 shows an overview of the automatic sprite S generation system of the present invention. This system includes shot detection (block 310) to group images that share the same static background and are thus suitable for sprite generation. A shot is a sequence of images covering the same scene (not necessarily static) from one camera. A sprite piece is automatically updated every time that the system receives a suitable input image. The sprite is useable when there is enough data in the same scene; otherwise, this sequence is considered not suitable for sprite coding. A good shot detection algorithm should be able to specify the characteristic of motion (e.g., zooming, panning) in that shot so that the global motion estimation can adjust its parameters properly (e.g., turn on/off block matching in the initial estimation when there is a pan/zoom motion). Any known shot detection scheme may be used.

An automatic masking process (block 310) may be required when a foreground object (e.g., an object that moves differently from the background) exists in the scene. A mask can be synthesized from the color distance difference between the foreground and background (assuming that color in the foreground and background are significantly different), similar to the blue screen technique (see commonly-assigned, co-pending U.S. patent application Ser. No. 09/156,790 to K. Panusopone and X. Chen, filed Sep. 17, 1998, and entitled "Modified Chroma Keyed Technique For Simple Shape Coding for Digital Video"). In such a case, the whole background that can cover the foreground is needed to be taken a priori.

Note that the useable data is used by both blocks 310 and 340. FIG. 3 only considers one shot at a time so the shot detection only detects the same shot with the useable data (all the pictures in the same shot are useable data).

The same shot decision block 320 analyzes the input frame with the knowledge of the previous useable data to decide whether the input frame belongs to the same shot. This analysis includes calculating the correlation parameter.

An "enough data" decision block 350 keeps track of the duration of the video sequence. The useful input for a sprite should be long enough to develop a significant trend in the sprite.

The sprite generation block 340 is covered by FIG. 1.

4.1 Initial Estimation

MPEG-4 VM perspective motion estimation works under the assumption that there is a small deformation among consecutive images. In this case, the LM converges reasonably well with the motion parameter of the most recent image as an initial estimation. To maintain this assumption, the input sequence is required to have only a slow motion. However, this causes a significant inconvenience to the cameraman. Our experiments confirm that reusing the previous motion parameter does not lead to a satisfactory result using LM when the final parameter is substantially different from the initial estimation. The solution to this problem is to use the past motion history to determine the initial estimation. With this scheme, the initial estimation can be close to the final parameter as long as the motion occurs in the same pattern no matter how different the parameter is between the consecutive images.

Any kind of (autocorrelation-based) linear prediction (e.g., differential pulse code modulation—DPCM) or non-linear prediction (e.g., spline interpolation) can be used to determine the initial estimation. The simplest, second order prediction is described mathematically as follows:

$$\vec{S}_n = \vec{S}_{n-1} + (\vec{S}_{n-1} - \vec{S}_{n-2})$$

Where $\vec{S}_n = [m[0]\ m[1]\ m[2]\ m[3]\ m[4]\ m[5]\ m[6]\ m[7]\ m[8]]^t$ is the motion parameter of the n-th image, and the superscript "t" denotes a transpose. This second order prediction differs from reusing the past motion parameter by the addition of the residual between motion parameters of the past and the next-to-past images. The second order prediction works under the assumption that the camera operates at more or less the same speed. The drawback of this prediction occurs in unusual cases when the motion does not follow the pattern of the previous two images, in which case the predicted initial estimation may be worse than that obtained by reusing the motion parameter.

Block matching, e.g., as used in M3096, is not suitable for initial estimation since it may select a totally irrelevant initial estimation when the consecutive pair of images have a strong motion in other parameters than translation, e.g., in case of zooming. However, block matching is recommended when the input sequence experiences an unpredictable pan, such as in sports sequence.

4.2 Outlier Rejection

It is extremely difficult to guarantee that all background in all natural input images are static. An outlier, which may happen because a leaf on a tree moves, or people turn their heads during the shot, causes a contradictory contribution for the LM process. The impact of an outlier may be severe if the outlier is dominant in the scene, e.g., the error from the outlier is particularly strong compared to the error from the rest of the scene. LM performance improves dramatically with outlier rejection because the error from the outlier is excluded. Moreover, the outlier provides a large error when the motion parameter is almost optimum.

Figure 4:
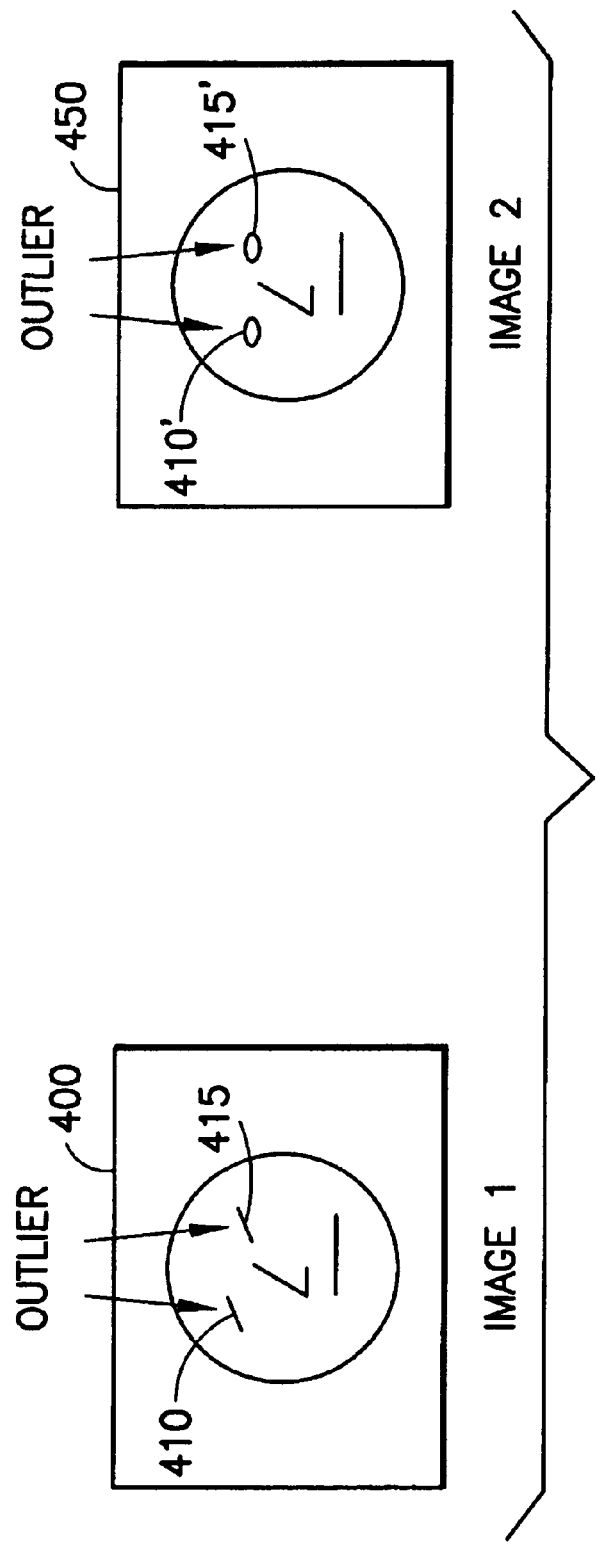
FIG. 4 illustrates an example of an outlier.

FIG. 4 illustrates an example of an outlier. For example, two identical facial images are shown at 400 and 450, except in image 1 (400), the eyes 410, 415 are closed, while in image 2 (450), the eyes 410', 415' are open. The open eyes 410', 415' are thus outliers when the motion parameter is optimum.

TQ works on the above principle to selectively eliminate all pixels that provide the highest 10 percent of errors. That is, according to FIG. 2, the current VOP is warped by the warping parameter obtained from the previous VOP (for the coarsest resolution) or the previous stage (coarser resolution). The errors of all pixels in the current VOP are then sorted, and pixels that yield the top 10 percent of the errors are declared outliers.

However, this straightforward technique performs poorly when the motion parameter is not close to optimum. The problem with TQ in such a case is that an important feature in the scene can misalign and act like an outlier.

The present invention overcomes this problem by using delayed elimination for outlier rejection.

Figure 5:
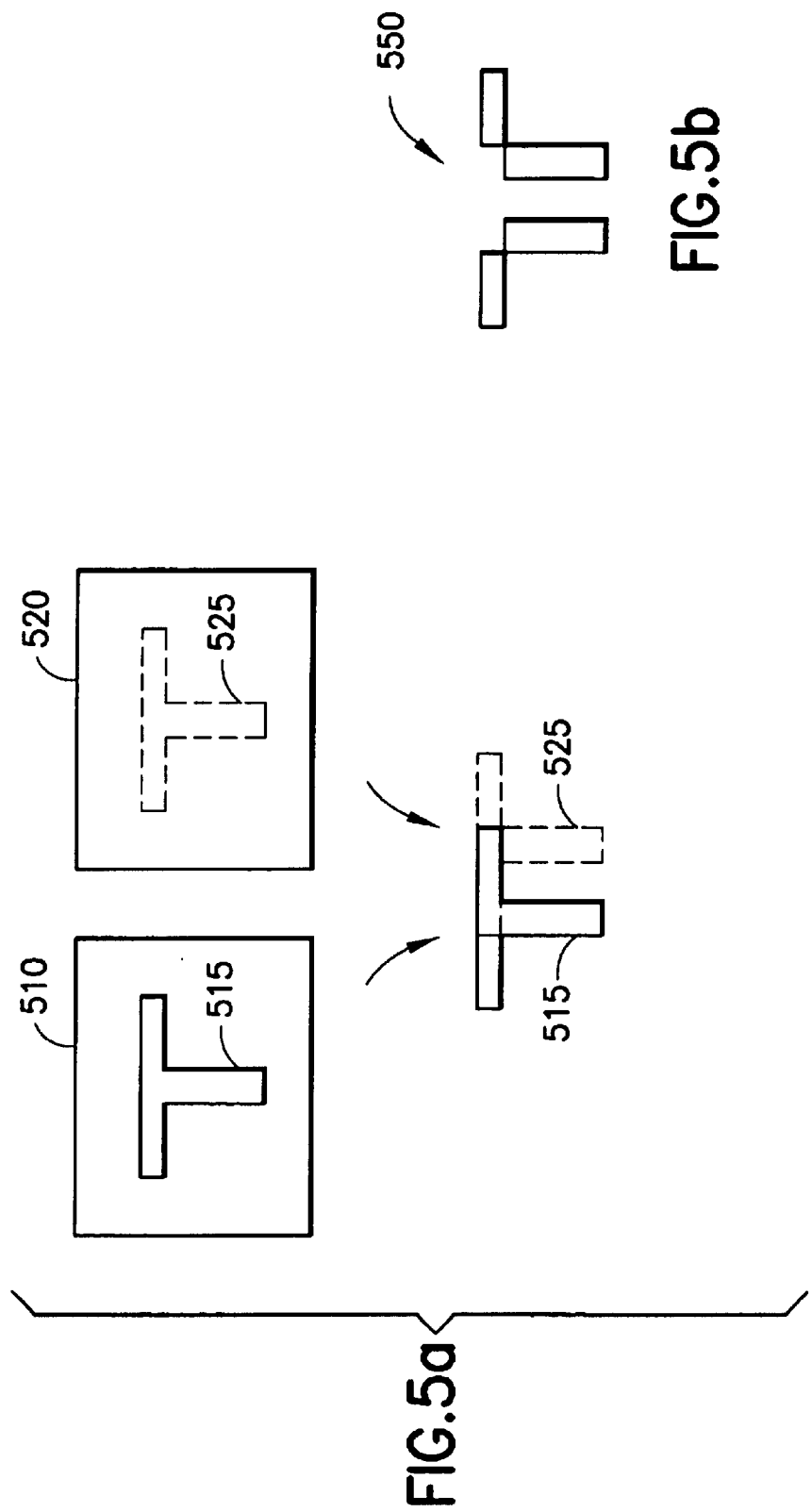
FIG. 5(a) illustrates a misaligned image that results with the Truncated Quadratic (TQ) outlier rejection method.
FIG. 5(b) illustrates an outlier that results with the Truncated Quadratic (TQ) outlier rejection method.

FIG. 5(a) and 5(b) show an example of the problem with the truncated quadratic method. For example, suppose we have two successive frames 510, 520 of the symbol 'T' 515, 525, respectively, that are misaligned as shown in FIG. 5(a). The image 550 of FIG. 5(b) shows the outlier in the case that the warping parameter is zero (assuming that no previous information is available). Here, unfortunately, all details in FIG. 5(b) will be eliminated according to TQ and, hence, the remaining details won't be able to determine the correct global motion.

Generally, the outlier pixels behave more randomly, like noise, which means they may match worse with the better motion parameter while it should not happen in an important feature. That is, the inconsistency should not happen in an important feature, e.g., a line, which usually yields a lower error with a better match (more iterations). It is important to realize that only a few crucial features are sufficient to determine the optimal motion parameter. In practice, as much test data as possible is used in the process because crucial features are very difficult to identify. Test data contains not only crucial features and outliers, but also meaningless data such as a plain background, which always matches well without revealing any information about the optimal motion parameter. It is likely that the meaningless data will dominate in the remainder of the test data when only a small amount of error is allowed. The final result in such a case will not resemble the optimal motion parameter. A better result can be obtained when more error is allowed and the ratio of the meaningless data to the important feature is more balanced. Of course, the performance will start to decline if the amount of error is too high and the outlier becomes a factor.

Figure 6:
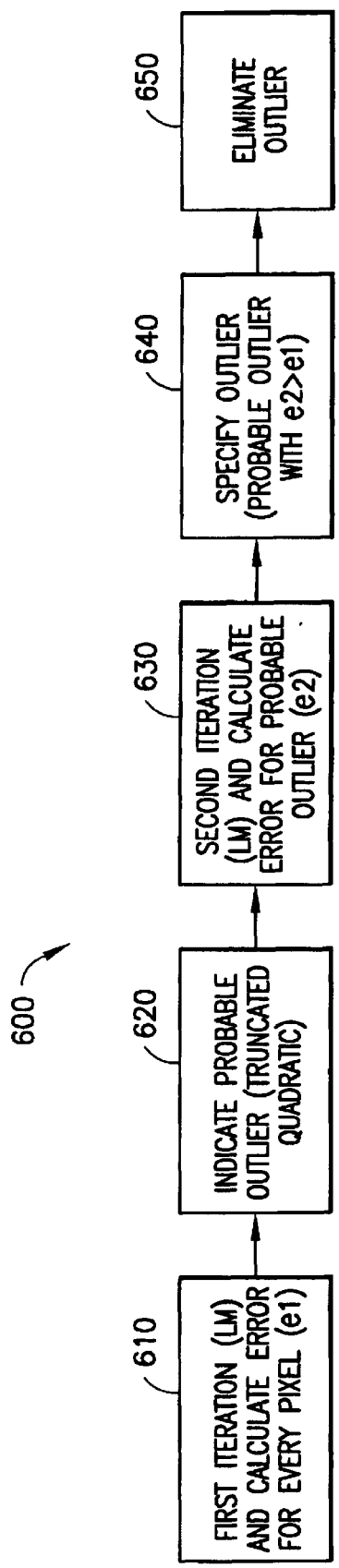
FIG. 6 illustrates a delayed elimination algorithm in accordance with the present invention.

FIG. 6 illustrates a delayed elimination process in accordance with the invention. Here, the performance of the outlier rejection can be improved with the addition of a delayed elimination process. In particular, instead of processing the error in one pass, more reliable information is available with a two-pass (or more) process.

In a first iteration (610), the LM minimization technique is performed, and an error (e1) is calculated for every pixel. At block 620, pixels that provide more error than the preset threshold are marked as probable outliers. These pixels are checked again after another iteration (630) to allow them to align better if they are an important feature. At block 640, pixels that have the higher error in the second pass behave like noise and are declared outliers. At block 650, the outliers are eliminated.

Note that other configurations based on this concept can be implemented with more complexity, such as delayed elimination based on three or more stages, advance methods to specify an outlier, etc. With three or more update stages, there is a trade-off between performance and complexity.

4.3 Sprite Generation for an Interlaced Source

Currently, MPEG-4 only processes sprite pieces in a frame format. There are two possible ways to code the interlaced input image as a sprite under the current MPEG-4 syntax. The first method forms a single frame input by deinterlacing the source and carries on the normal sprite generation. The second method forms two sprites based on each field then combines both field sprites to generate a frame sprite. These two solutions have one sprite piece to encode and one set of parameters to transmit. However, these approaches do not result in optimal performance in many cases.

Figure 10:
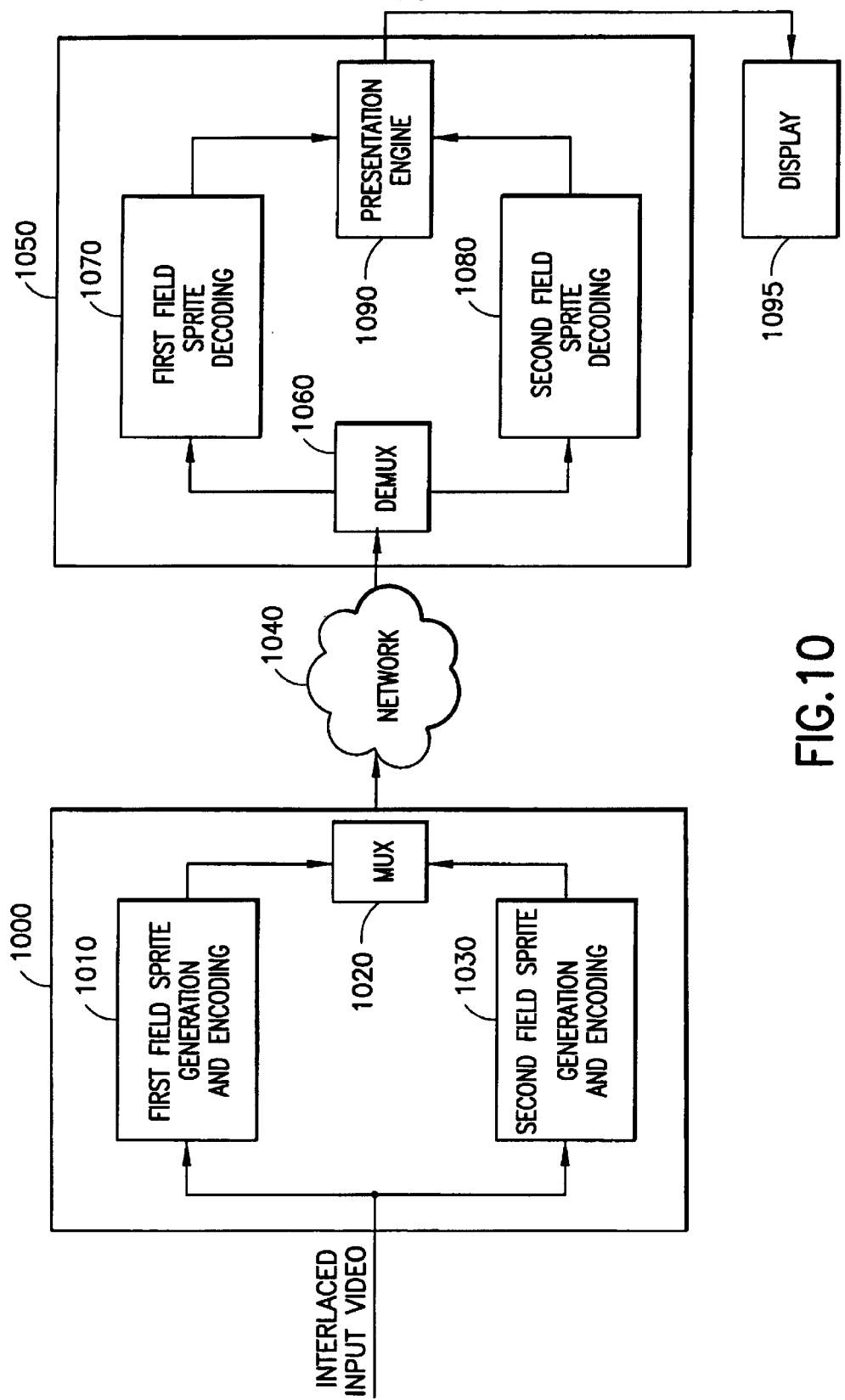
FIG. 10 illustrates an encoder and decoder for processing an interlaced source in accordance with the present invention.

FIG. 10 illustrates an encoder 1000 and decoder 1050 (e.g., in a decoder population) for processing an interlaced source in accordance with the present invention. Here, the MPEG-4 syntax is modified to process an interlaced source as two independent inputs (one for each field), e.g., at sprite generation and encoding functions 1010 and 1030. After being encoded, multiplexed at a mux 1020, and transmitted across a network 1040, the two field sprites and associated motion parameter data are demultiplexed at a demux 1060, and decoded at decoding functions 1070 and 1080.

The field sprites are output from the respective functions 1070 and 1080 and combined at a presentation engine 1090 to form a combined sprite output, e.g., for a display 1095.

Note that the encoder 1000 and decoder 1050 are shown in a simplified form. Moreover, while the functions 1010 and 1030, and 1070 and 1080 are illustrated as being separate, they may in practice utilize common software and/or hardware as will be apparent to those skilled in the art.

In this embodiment, the two sprite pieces are encoded separately, and two sets of motion parameters have to be transmitted and decoded. However, the performance of this sprite is better than the other two MPEG-4 compliance methods, e.g., for complex motion, where two fields in the same frame are likely to have a different deformation (motion parameter).

5. Sprite Generation Guidelines

Several observations have been collected from our experiment on sprite generation. These observations are guidelines for successful sprite generation.

1. The initial estimation is the most important factor for the minimization process. A better initial estimation has a higher chance of obtaining an optimum sprite motion parameter.

2. The speed of the camera should be constant (at any speed) because our initial estimation is based on a linear prediction model (distance residual).

3. A more complicated prediction model (e.g., velocity residual) is possible to compensate for the highly complex function of camera speed.

4. It is recommended that the change of speed or direction of the camera should be done at a gradual rate (e.g., from the rest position to the operating speed) since the prediction model needs to fill the relevant past history before it can predict a reliable initial estimation.

5. Initial estimation based on block matching (e.g., M3096) performs poorly when the current image experiences zooming, shear or rotation, but it usually helps in the case of a complicated pan. Shear is an effect of changing a rectangle into a parallelogram.

6. Outlier rejection helps preserve the important features in the scene. It is very difficult to align a fine detail (e.g., text) without reliable outlier rejection.

7. A two-pass system, which uses a final motion parameter of the first pass as an initial estimation of the second pass, yields a slight improvement (less than 1 dB, PSNR). A higher order system (e.g., three, four) is expected to yield a negligible improvement over a two-pass system.

8. Errors in a sprite generated by misregistration of any input image have an equal effect regardless of the order in which the errors occur. This is also true in the more general term, e.g., order of the occurrence (VOP number).

Figure 7:
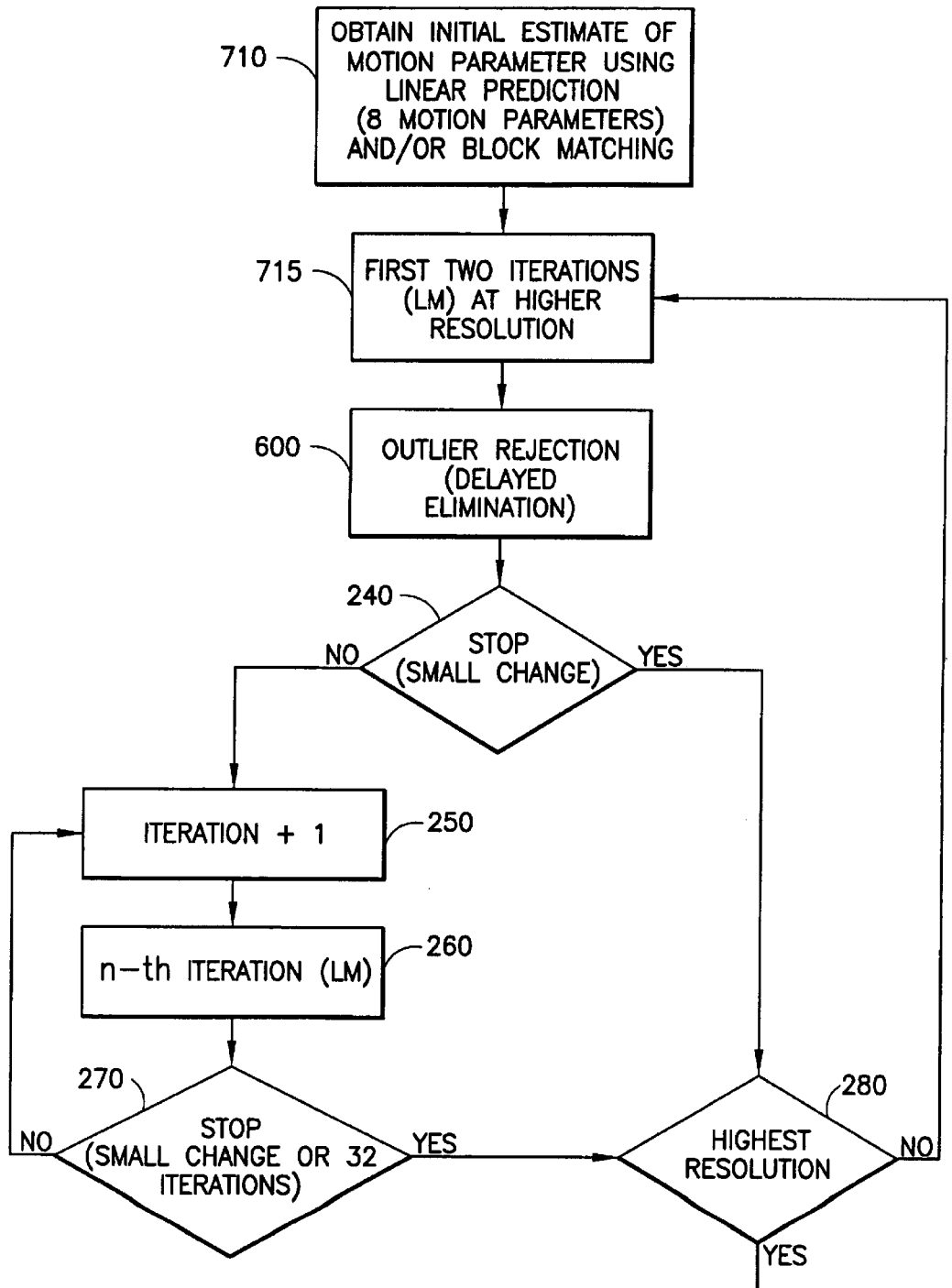
FIG. 7 illustrates a method for global motion estimation in accordance with the present invention.

FIG. 7 shows a global motion estimation process in accordance with the present invention.

The process is based on FIG. 2 but differs in blocks 710, 715 and 720.

Specifically, at block 710, an improved initial estimation of a motion parameter is obtained. Linear prediction using eight motion parameters (e.g., m[0] through m[8], discussed previously), or block matching may be used. Alternatively, non-linear prediction may be used. Moreover, these motion parameters are not part of the sprite coding in MPEG-4, which uses the position of the four corners which are derived from motion parameters.

At block 715, the first two iterations of the sprite are performed at a higher pixel resolution.

At block 600, the delayed outlier rejection of FIG. 6 is performed.

Figure 8:
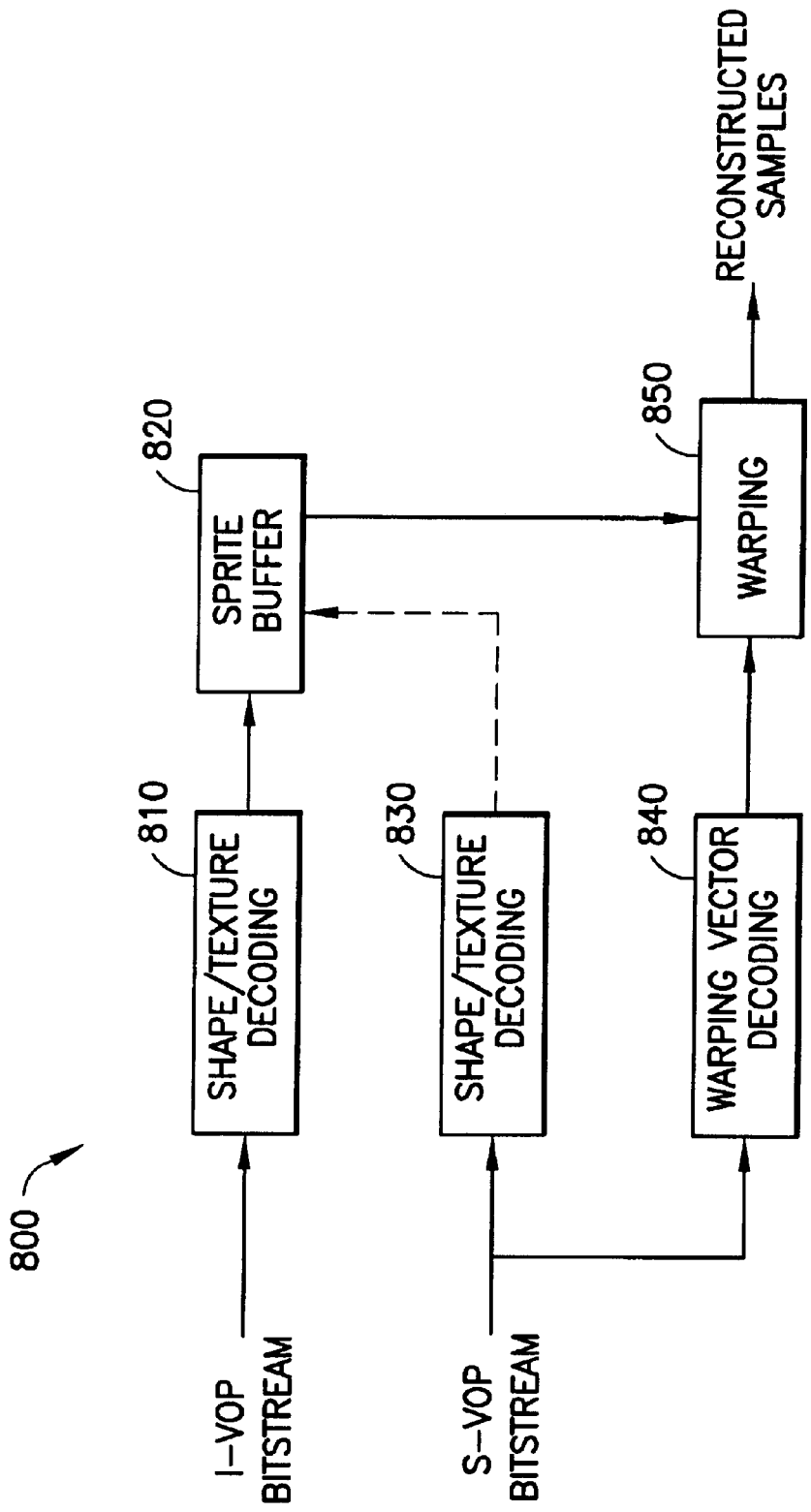
FIG. 8 illustrates a sprite decoder.
Figure 9:
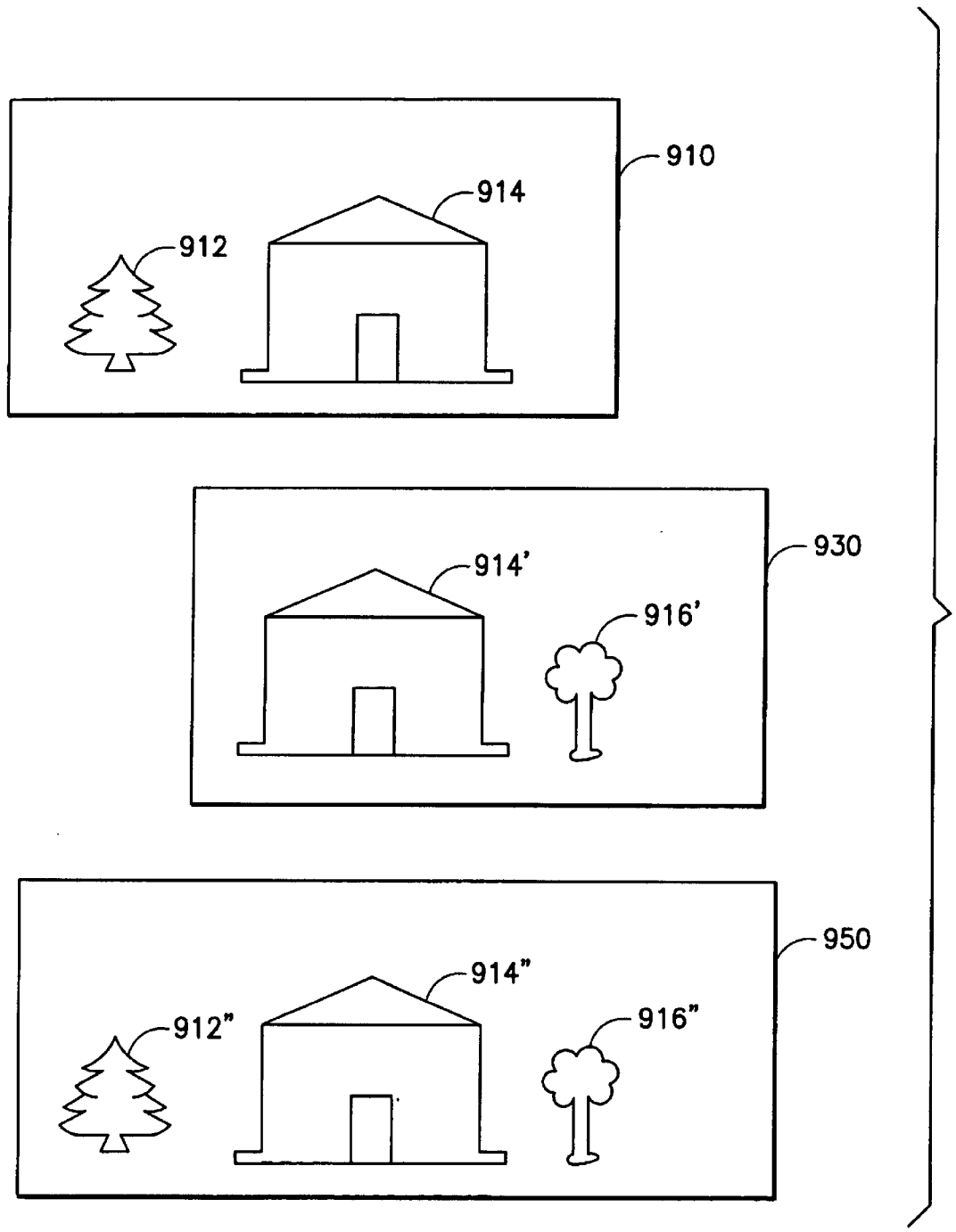
FIG. 9 illustrates the formation of a sprite.

FIG. 8 illustrates a sprite decoder 800, which includes a shape/texture decoder 810 for I-VOPs, a shape/texture decoder 830 and a warping vector decoder for S-VOPs (sprite VOPs), a sprite buffer 820, and a warping function 850 for providing reconstructed samples.

6. Simulation Results

Parameters in the proposed system that are allowed to vary are the search range for block matching, and the threshold for error truncation. Other variables are held constant, i.e., the number of iterations, the stopping threshold, the amount/level of pixel resolution (e.g., 128×128, 256×256 and 512×512), to draw a clear comparison between the proposed system and M3096. All input sequences are either cropped or masked to exclude the foreground object. An uncontrolled condition is simulated by skipping a constant number of images to create a more severe deformation.

Tests were run for a variety of targeted applications (e.g., stock ticker, currency ticker) to obtain the final sprite piece generated by the present invention. The sprites were also encoded together with their associated motion parameter by the MPEG-4 encoder to illustrate the coding efficiency of the proposed system. These tests verified the success of the present invention.

7. Conclusions

This memo describes improvement techniques for the MPEG-4 based global motion estimation for sprite generation. The proposed techniques perform much better than the current MPEG-4 scheme in uncontrolled situations, which are more likely to occur in practice. Several key solutions to the VM global motion estimation have been proposed, i.e., initial estimation techniques, delayed elimination for outlier rejection, and sprite generation for interlaced sources. The proposed techniques support the current MPEG-4 encoder requirement, and are also capable of providing a reliable motion parameter for GMC and DS in MPEG-4 version 2.

Although the invention has been described in connection with various specific implementations, it should be appreciated that various adaptations and modifications can be made thereto without departing from the scope of the invention as set forth in the claims.

What is claimed is:

1. A method for generating a sprite from at least an initial input image, comprising the step of:

providing an initial estimate of motion parameter data for providing a registration between the sprite and the initial input image based on motion parameter data of at least two input images that precede the initial input image.

2. The method of claim 1, wherein:

the initial estimate is provided based on a linear function of the motion parameter data of the at least two input images that precede the initial input image.

3. The method of claim 1, wherein:

the initial estimate is provided based on a non-linear function of the motion parameter data of the at least two input images that precede the initial input image.

4. The method of claim 1, wherein:

the initial estimate $S_n$ is provided according to: $S_n = S_{n-1} + (S_{n-1} - S_{n-2})$, where $S_{n-1}$ is the motion parameter data of an input image that precedes the initial input image, and $S_{n-2}$ is the motion parameter data of the next preceding input image.

5. The method of claim 1, wherein:

the at least two input images that precede the initial input image are associated with a different sprite than the sprite that is associated with the initial input image.

6. A method for generating a sprite from a plurality of input images, comprising the step of:

performing shot detection on the input images to provide a group of successive images that share a common scene for use in forming the sprite.

7. The method of claim 6, wherein:

the scene is a static background.

8. The method of claim 6, wherein:

the shot detection detects at least one of zooming and panning.

9. The method of claim 6, comprising the further step of:

providing an initial estimate of motion parameter data for providing a registration between the sprite and an initial input image using block matching when panning is detected.

10. The method of claim 6, comprising the further step of:

providing an initial estimate of motion parameter data for providing a registration between the sprite and an initial input image with block matching turned off when zooming is detected.

11. The method of claim 6, wherein:

the shot detection comprises scene detection.

12. A method for generating a sprite from at least an initial input image, comprising the steps of:

providing at least first and second successive estimates of motion parameter data for providing a registration between the sprite and the initial input image;

determining at least first and second errors between pixels of the initial input image and pixels of the sprite based on the at least first and second estimates, respectively;

wherein the second estimate is obtained by updating the first estimate based on the first error; and eliminating the pixels whose second error exceeds their first error from consideration in generating the sprite.

13. The method of claim 12, comprising the further step of:

designating pixels in the initial input image and/or the sprite whose first error exceeds a threshold as probable outliers;

wherein the second error is obtained at least for the pixels designated as probable outliers.

14. The method of claim 12, wherein:

the first and second errors are determined using a Levenberg-Marquardt minimization technique.

15. A method for generating sprite data from at least one initial input image that comprise interlaced first and second fields, comprising the steps of:

generating separate first and second field sprites with separate motion parameter data for the first and second fields, respectively, of the at least one input image; and encoding the first field sprite and its associated motion parameter data separately from the second field sprite and its associated motion parameter data for transmission to at least one decoder.

16. The method of claim 15, wherein:

a presentation engine at the at least one decoder combines the first field sprite and second field sprite transmitted thereto to form a combined sprite output.

17. A method for processing sprite data at a decoder, comprising the steps of:

receiving data transmitted from an encoder, said data comprising an encoded first field sprite and its associated motion parameter data, and a separately encoded second field sprite and its associated motion parameter data;

wherein the first and second field sprites are generated from interlaced first and second fields, respectively, of at least one initial input image at the encoder;

decoding the encoded first field sprite and its associated motion parameter data to provide a first field sprite output;

decoding the encoded second field sprite and its associated motion parameter data to provide a second field sprite output; and combining the first field sprite output and second field sprite output to form a combined sprite output.

18. An apparatus for generating a sprite from at least an initial input image, comprising:

a memory for storing input image data;

motion estimation means operatively associated with said memory for providing an initial estimate of motion parameter data for providing a registration between the sprite and the initial input image based on motion parameter data of at least two input images that precede the initial input image; and sprite generation means for generating a sprite from at least an initial input image.

19. An apparatus for generating a sprite from a plurality of input images, comprising:

shot detection means for performing shot detection on the input images to provide a group of successive images that share a common scene; and sprite generation means for forming the sprite from said group of successive images.

20. An apparatus for generating a sprite from at least an initial input image, comprising:

means for providing at least first and second successive estimates of motion parameter data for providing a registration between the sprite and the initial input image;

means for determining at least first and second errors between pixels of the initial input image and pixels of the sprite based on the at least first and second estimates, respectively;

wherein the second estimate is obtained by updating the first estimate based on the first error; and means for eliminating the pixels whose second error exceeds their first error from consideration in generating the sprite.

21. An apparatus for generating sprite data from at least one initial input image that comprises interlaced first and second fields, comprising:

first means for generating first field sprites with first motion parameter data for the first fields of the at least one input image; and second means for generating second field sprites with second motion parameter data for the second fields of the at least one input image.

22. A decoder for processing sprite data, comprising:

means for receiving data transmitted from an encoder, said data comprising an encoded first field sprite and its associated motion parameter data, and a separately encoded second field sprite and its associated motion parameter data;

wherein the first and second field sprites are generated from interlaced first and second fields, respectively, of at least one initial input image at the encoder;

means for decoding the encoded first field sprite and its associated motion parameter data to provide a first field sprite output;

means for decoding the encoded second field sprite and its associated motion parameter data to provide a second field sprite output; and a presentation engine for combining the first field sprite output and second field sprite output to form a combined sprite output.

* * * * *